US011165738B2

(12) United States Patent
    Gucciardi (10) Patent No.: US 11,165,738 B2
(45) Date of Patent: Nov. 2, 2021

(54) SYSTEM AND METHOD FOR SELECTIVE PROCESSING OF WEB CONTENT (71) Applicant: Gaspare Gucciardi, Ustica (IT)

(72) Inventor: Gaspare Gucciardi, Ustica (IT)

( * ) Notice: Subject to any disclaimer, the term of this patent is extended or adjusted under 35 U.S.C. 154(b) by 0 days.

(21) Appl. No.: 16/645,925

(22) PCT Filed: Nov. 29, 2018

(86) PCT No.: PCT/IB2018/059443
§ 371 (c)(1),
(2) Date: Mar. 10, 2020

(87) PCT Pub. No.: WO2019/123056
PCT Pub. Date: Jun. 27, 2019

(65) Prior Publication Data
US 2020/0280531 A1  Sep. 3, 2020

(30) Foreign Application Priority Data

Dec. 21, 2017 (IT) .......................... 102017000148052

(51) Int. Cl.
*H04L 12/58* (2006.01)
(52) U.S. Cl.
CPC .............. *H04L 51/32* (2013.01); *H04L 51/18* (2013.01)
(58) Field of Classification Search
CPC .......... H04L 51/32; H04L 51/18; H04L 51/16
See application file for complete search history.

(56) References Cited

U.S. PATENT DOCUMENTS

| 2013/0019319 | A1* | 1/2013 | Pearlman | H04L 63/104 726/27 |
| 2016/0188597 | A1 | 6/2016 | Moore | |
| 2016/0373454 | A1* | 12/2016 | Ball | H04L 67/02 |
| 2017/0193126 | A1 | 7/2017 | Albouyeh et al. | |

FOREIGN PATENT DOCUMENTS

WO  2016005664 A1  1/2016

OTHER PUBLICATIONS

International Search Report and Written Opinion dated Feb. 15, 2019 for counterpart International Application No. PCT/IB2018/059443.

* cited by examiner

*Primary Examiner* — Soe Hlaing
(74) *Attorney, Agent, or Firm* — Shuttleworth & Ingersoll, PLC; Timothy Klima (57) ABSTRACT A system for selective processing of web content wherein a processing unit executes an online application accessible to different users, and includes a first reception module for receiving, for a first user, a web name representing first web content; a first processing module for coupling to the web name the first web content with a coupling logic, a third reception module for receiving a request for access to the online application by a second user, a fourth reception module for receiving a selected web name from a stored list; an access module for accessing the first web content coupled; a second processing module for selectively processing the first web content and processing content received by the first user as a function of the coupling logic, and as a function of the selected web name and interaction content received by the second user.

13 Claims, 8 Drawing Sheets

[OACi] = ">", [OACf] = null, Q1 = ">N1"

Fig 4

[OACi] = ">", [OACf] = null, Q1 = ">N1"

Fig 5

[OACi] = ">", [OACf] = null, Q1 = ">N1"

Fig 6

P1
([OACi]=">", [OACf]=null)

Fig 7

SYSTEM AND METHOD FOR SELECTIVE PROCESSING OF WEB CONTENT

This application is the National Phase of International Application PCT/EP2018/059443 filed Nov. 29, 2018 which designated the U.S.

This application claims priority to Italian Patent Application No. 102017000148052 filed Dec. 21, 2017, which application is incorporated by reference herein.

TECHNICAL FIELD

This invention relates to a system for the selective processing of web content. The invention also relates to a method for the selective processing of web content.

BACKGROUND ART

It is known that social networks have introduced functionalities and conventions for the consultation of information which have become widespread common practice amongst the users and creators of web content. For example, the symbol "@" (at) denotes a "profile" or a "page", whilst the symbol "#" (hashtag) denotes a TAG which acts as a thematic aggregator.

Given that the users are substantially free to select the hashtags to be attributed to the content, it is possible that a flow of content originating from a certain hashtag becomes "polluted" by other content which is not pertinent, or even inopportune and offensive, the control of which can be quite demanding.

In fact, considering the hashtags as tags or markers which any user may apply to a content, the hashtags create flows of thematic aggregations which cannot be predicted in advance.

The use of the hashtags would be predictable only if they had constraints for the users; on the other hand, if the emission of a hashtag were only allowed by its hypothetic al owner, or by a group of authorised users, or solely for confidential content, the other users would not be free to contribute to discussions which could be formed by means of the hashtag, which would adversely affect functionalities and scope.

Therefore, this prior art technique, associating in an uncontrolled manner names provided by a user to specific content, is not able to provide a processing of web content which is efficient and contextualised.

In this field of application there is in fact no symbolic operator, for example ">" according to the invention, complementary to "@" and "#", for associating to the "web name" preceded by the symbol a set of content which is strictly focused and contextualised.

According to a second more general aspect, the Domain Name System (DNS) allows the association of domain names, subjected to a series of formal and hierarchical rules, to internet addresses (IP), to allow the assignment of URLs (Uniform Resource Locator) to resources available on the Internet. The users pay for the service for registering domain names to reserve the exclusive assignment of a given URL at a given website or Internet service.

Also in this more general case, the prior art, associating in an uncontrolled manner domain names selected by the user to specific content, is not able to provide an efficient and contextualised processing of web content.

The aim of this invention is to provide a method/system for selectively processing web content which is capable of achieving an efficient coupling of web content flows.

DISCLOSURE OF THE INVENTION

According to a first aspect, the invention describes a system for the selective processing of web content, as disclosed herein.

Advantageous aspects are described herein.

According to a second aspect, the invention describes a method actuated by a computer for the selective processing of web content, as disclosed herein.

Advantageous aspects are described herein. According to a third aspect, the invention describes a computer program, designed, when running on a computer, to perform the steps of the method of the second aspect. According to a fourth aspect, the invention describes an operator software, as disclosed herein.

The invention achieves an efficient and contextualised processing of web content.

More specifically, the invention provides a functionality which rapidly associates, to a given name (easy to remember) selected by a user, a flow of very specific content, which is also predetermined and controlled by the user, achieving an efficient coupling of web content flows.

Given the widespread diffusion of social network applications on smartphones and other mobile devices, the invention makes it possible to obtain very focused information flows, in particular avoiding the use of QR codes in applications in which the graphical impact is a limiting factor, such as for labels of food and wine products, or in situations where, for practical reasons (poor lighting, curvature of surfaces, distance, etc.) use of QR codes by users is awkward.

The information flows generated can be consulted and analysed within reasonable times due to the fact that the coupling logics for the flows and their dependence on a certain web name determines a reasonable and manageable size, unlike content flows managed with the known aggregation criteria of search engines, thematic aggregators, etc.

More specifically, the invention provides a functionality for coupling to an arbitrary name (not constrained by the formal rules of domain names DNS), registered and selected by a user, one or more specific contents, for example a selection of posts from a social network, a page of a blog, and so on, which are efficiently contextualised. In other words, the invention provides a method which allows a rapid association of a name which is "universal" and transversal on the Internet, registered by an "owner" of the name, to flows of selected and contextualised information relating to a given idea or material object.

In the method according to the invention, the results of the searches do not depend on positioning on the basis of ranking algorithms, but depend only on the logics of efficient contextualization.

The technical effects/advantages mentioned and the other technical effects/advantages of the invention are described in more detail below in the description of an embodiment illustrated by way of general example in the accompanying drawings.

BRIEF DESCRIPTION OF THE DRAWINGS

FIGS. 1A to 7 show possible embodiments of the system/method of FIG. 1.

DETAILED DESCRIPTION

The invention relates to a system for selectively processing web content and a corresponding method actuated by a computer for the selective processing of web content.

The invention implements an online application accessible to a plurality of different users wherein a web name, selected by an owner user, is coupled with web content as a function of a coupling logic and processed selectively as a function, primarily, of the web name selected and processing content received by the owner user on the basis of the coupling logic, and as a function, secondarily, of the selected web name and the interaction content received by a non-owner user, thereby generating processed coupled web content.

In this way, a selection of content controlled by the owner user of the web name is obtained, allowing the association of a name which is efficient from the communicational point of view to very precise content correlated to an idea (a product, an event, a track considered important, etc.), routing it by means of channels (e.g. social network, blog . . . ) and devices (e.g. smartphone . . . ) which are widespread and used, as well as using the interactivity of the insertion and search interfaces.

Figure 1:
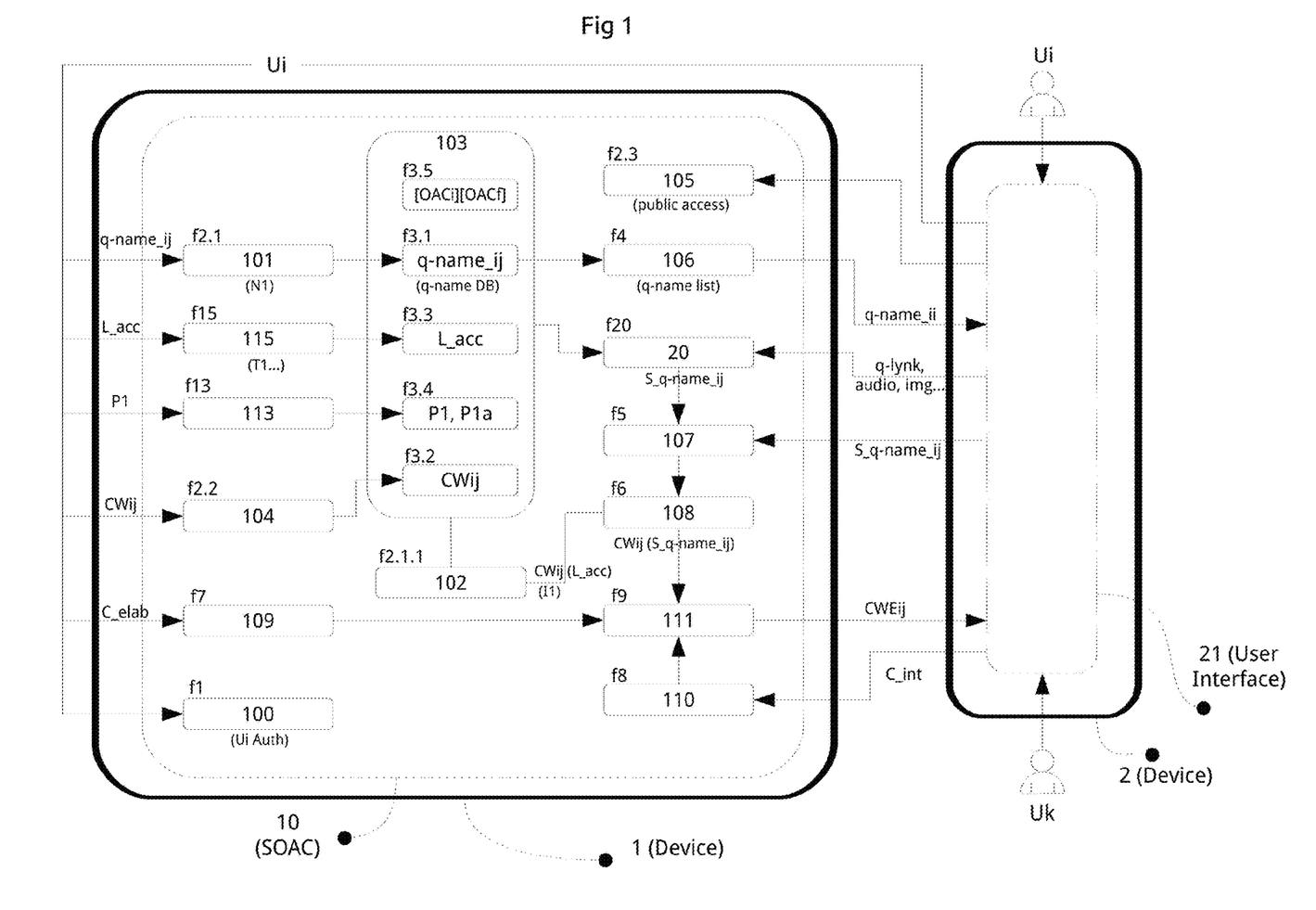
FIG. 1 is a schematic view of a system/method for selectively processing web content, according to the invention.

With reference to FIG. 1, the system comprises at least a first electronic device 1 and a second electronic device 2.

The first electronic device 1 comprises a processing unit 10 configured for executing an online application SOAC accessible to a plurality of different users Ui, Uk. According to the invention, the online application SOAC comprises, for example, one between a social network, an instant messaging application (e.g. WhatsApp), a search engine (e.g. Google), a video-sharing platform (e.g. YouTube), a social media aggregator application (applications such as Taggbox.com or qlynk.net shown in FIGS. 3, 4, 7) or the like.

According to the invention, the online application SOAC may be in the form of web applications, smartphone apps, etc.

The second electronic device 2, comprising a user interface 21, in data communication with the processing unit 10, and configured to allow an access request to the online application SOAC by, respectively, at least a first user Ui and/or at least one second user Uk.

In general it should be noted that, in this context and in the following claims, the processing unit 10 is presented as divided into separate functional modules (memory modules or operating modules) for the sole purpose of describing the functionality in a clear and complete manner.

In reality, the processing unit 10 may, in one case, consist of a single electronic device, suitably programmed to perform the functions described and the various modules can correspond to hardware units and/or software routines forming part of the programmed device.

Alternatively or in addition, the functions can be performed by a plurality of electronic devices on which the above-mentioned functional modules can be distributed. The processing unit 10 may also have one or more processors for the execution of the instructions contained in the memory modules.

The above-mentioned functional modules may also be distributed on different computes, either locally or remotely, on the basis of the architecture of the network on which they are housed.

More specifically, according to the invention, the processing unit is configured for executing the online application SOAC.

More specifically, with reference to FIG. 1, the processing unit 10 comprises an authentication module 100 configured for authenticating f1 at least a first user Ui of a plurality of different users.

According to the invention, the processing unit 10 also comprises a first reception module 101 configured for receiving f2.1, for the at least one first user Ui, a web name q-name_ij representing web content which can be coupled CWij.

In the description below, the first user Ui will be considered the user who inserts the web name(s) for a logical and contextualised coupling of web content.

In other words, a user Ui registers and reserves, if necessary by payment through the provider of the online application, the desired web name q-name_ij, thereby becoming proprietor and owner, preferably for a predetermined time.

The range or visibility of the web name q-name_ij is extended to all the users Ui, Uk of the online application.

The expression "registration of a name" by a user, is used to mean an agreement between the user Ui and a supplier of Internet services and/or software applications, in order to guarantee, within the field of operation controlled by the supplier, certain privileges correlated with the use of that name.

The implementation of a q-lynk, that is to say, a "free" name q-name coupled to content preselected by the owner user of the q-name, also represents a significant innovation both in conceptual and practical terms with respect to the usual paradigm URL (hyperlink)+website, since:

any user can couple content to a q-name of which he/she is owner, and therefore define a flow of information defined by the user, without the intermediation of a webmaster or without particular skills;

the q-name is not constrained by the rules of the DNS or of the semantic web; the communication and the promotion of information may be performed by means of a string of arbitrary text instead of by using a URL; this may also simplify the transmission of information towards the system which implements the q-lynk by other electronic devices (for example, radio frequency TAG, BLE Beacon, etc.), or other mechanical or electromechanical devices, with or without electricity supply;

the search results for focused information (micro-content or multi-channel content) are not subject to ranking algorithms as occurs for the web sites.

According to the invention, the processing unit 10 comprises a memory module 103 configured for storing f3.1 web names q-name_ij for at least the first user Ui received from the first reception module 101.

The first reception module 101 is also configured for comparing the received web name q-name_ij with the web names included in the memory module 103 and registering the web name q-name_ij, for the at least a first user Ui, in the memory module 103 in the case of a negative result of the comparison.

In other words, no user of the online application SOAC can register a web name q-name_ij already registered and under validation.

Preferably, the same user can register different web names q-name_ij.

Generally speaking, the first reception module 101 is configured for:

receiving a web name q-name_ij representing first web content (CWij) which can be coupled with the web name q-name_ij by at least a first user Ui authenticated by means of the authentication module 100;

comparing the received web name q-name_ij with the web names included in the memory module 103;

registering the web name q-name_ij for the at least a first user Ui in the memory module 103 in the case of a negative result of the comparison.

According to the invention, the first web content which can be coupled CWij can be coupled with the web name q-name_ij as a function of a coupling logic L_acc. According to the invention, the coupling logic L_acc establishes the integration logic criterion between the web name q-name and the content which can be coupled CWij. The technical effect achieved is the obtaining of logically correlated and contextualised data/information.

In other words, the processing unit 10 comprises a first processing module 102 configured for coupling (F2.1.1) to the web name q-name_ij the first web content which can be coupled CWij, as a function of a coupling logic L_acc.

According to the invention, the coupling logic L_acc is defined as a function of the online application SOAC.

The processing unit 10 comprises logic insertion module 115 configured for an insertion f15 of a coupling logic L_acc by the at least a first user Ui.

Preferably, the coupling logic L_Acc is defined at the moment of defining the web name q-name_ij.

Alternatively, the coupling logic L_Acc is defined after defining the web name q-name_ij.

According to a further alternative, the coupling logic L_Acc is redefined after the definition of the web name q-name_ij, after having been defined at the moment of defining the web name q-name_ij.

The memory module 103 is configured for storing f3.3 the coupling logic L_acc. In other words, the owner user of the q-name, first user Ui, may manage (update, modify) the association of the contents starting from the initial ones, and the contents are selected and displayed on the basis of the functionality provided by the online application SOAC.

For example, if the online application SOAC is a social network, the contents are selected on the basis of what and how it can be shared publically.

For example, if the online application SOAC is a video-sharing platform (such as YouTube), the contents are selected on the basis of the criteria for displaying the video clips.

The processing unit 10 comprises a second reception module 104 configured for receiving (f2.2) from the first user Ui a stored list of the web content which can be coupled CWij to the web name q-name_ij.

The memory module 103 is configured for storing f3.2 the first web content which can be coupled CWij, to the web name q-name_ij stored.

The term "content" means a series of text and multimedia information published on the Internet using one or more channels (social networks, video sharing platforms, blogs, etc.), which can be used by means of devices connected to the Internet.

More specifically, the term "post" relates to a message published on the Internet, if necessary provided with multimedia elements, which is open to interaction with the other users in terms of "likes", further comments, and other means of participation which are typical of social networks.

According to the invention, the user Ui, owner of the web name q-name_ij establishes, by means of specific functions of the online application SOAC managed by the processing unit 10, which public content, that is to say, which first web content which can be coupled CWij, associating with the web name q-name_ij; the set of this content will also be associated with a particular URL assigned by the online application SOAC; the types of content which can be associated, and the respective display, are determined by the particular online application SOAC.

Figure 2:
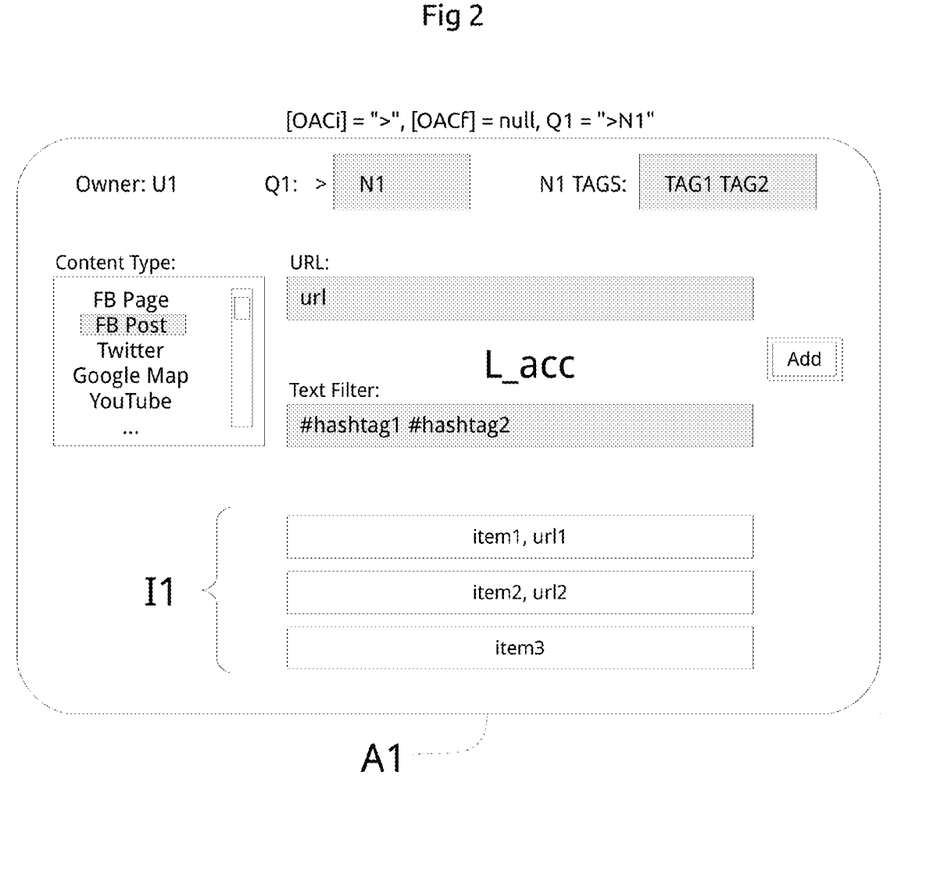

Preferably, according to the invention, the web content which can be coupled CWij comprises one or more between:

an image representing the web name q-name_ij;

a selection of individual Facebook public posts using the URLs of the individual posts;

a selection of public Facebook posts, extracted from an existing page or profile, filtered automatically using one or more hashtags or other text strings (e.g. all the posts of a page which contain both the hashtags "#olio #biologico", as shown in FIG. 2);

a feedback from a Facebook page;

preview of one or more YouTube videos, by mans of individual URLs;

Google Maps using the individual URLs;

public content, associated with the q-name, similarly selected by other social networks or content management systems (Twitter, Instagram, Pinterest, blog, etc.).

According to the invention, a second user Uk may request an access to the online application SOAC and request a display of the web names q-name_ii stored. The processing unit 10 comprises a third reception module 105 configured for receiving f2.3 the access request to the online application SOAC.

Preferably, the access request is executed by the first user Ui or the second user Uk.

A first transmission module 106 is configured for transmitting f4 the list of web names q-name_ii stored, in particular to the second user Uk who requested them. According to the invention, the user interface 21 is configured for displaying the web names q-name_ii stored.

In other words, by using the interface 21, a first user Ui or a second user Uk can display a list of web names q-name_ii stored, whose corresponding associated first web content CWij can be searched for selectively as a function exclusively of the web names q-name_ii registered, thereby achieving a selective search of first web content CWij.

According to an embodiment, the second user Uk who wants to access the first web content which can be coupled CWij to one of the q_name_ij received, selects through the user interface 21 the corresponding web name, thus determining a selected web name S_q-name_ij.

More generally speaking, the user interface 21 is configured to allow the selection of the selected web name S_q-name_ij from the list of web names q-name_ii displayed, in which the selection is carried out by one or more between the first user Ui and the second user Uk.

The processing unit 10 receives (f5) the web name selected S_q-name_ij, selected from the list of the web names q-name_ii stored.

More specifically, the processing unit 10 comprises a fourth reception module 107 configured for receiving (f5) the web name selected S_q-name_ij from the list of web names q-name_ij stored.

The processing unit 10 accesses (f6) ten first web content which can be coupled CWij, as a function of the web name selected S_q-name_ij.

More specifically, the processing unit 10 comprises an access module 108 configured for accessing (f6) the first web content which can be coupled CWij, as a function of the web name selected S_q-name_ij.

According to the invention, the processing unit 10 also comprises a fifth reception module (109) configured for receiving f7 processing content C_elab by the at least one first user Ui as a function of the coupling logic L_Acc.

The technical effect achieved is the processing of the first web content which can be coupled CWij by a selective integration of it.

According to the invention, the processing unit 10 also comprises a sixth reception module 110 configured for receiving f8 interaction content C_int by the at least one second user (Uk).

The technical effect achieved is the processing of the first web content which can be coupled CWij by a an integration of the interaction content.

Preferably, the interaction content comprises likes, comments, connections to other web names already registered (q-lynk), etc.

According to the invention, the user interface 21 is configured to allow an insertion of a list of processing content C_elab as a function of the web name selected S_q-name_ij.

In other words, the processing content C_elab comprises content inserted by the at least one first user Ui, regarding the selected web name S_q-name_ij; in this way, the content inserted is contextualised to the selected web name.

The user interface 21 is also configured for allowing a sending of the interaction content C_int by the at least one second user Uk, as a function of the selected web name S_q-name_ij.

According to an embodiment, the insertion of interaction content C_int can also be performed by the at least a first user Ui.

According to the invention, the first web content which can be coupled CWij is selectively processed (f9) as a function of the web name selected S_q-name_ij and the processing content C_elab received from the at least a first user Ui, as a function of the coupling logic L_Acc.

According to the invention, the first web content which can be coupled CWij is also selectively processed (f9) as a function of web name selected S_q-name_ij and the interaction content C_int received by the at least one second user Uk.

The technical effect achieved by the above-mentioned selective processing is a generation of processed web content which can be coupled CWEij.

More specifically, the processing unit 10 comprises a processing module 111 configured for selectively processing f9 the first web content which can be coupled CWij as a function of:
(i) the web name selected S_q-name_ij, and processing content C_elab received by the at least one first user Ui As a function of the coupling logic L_Acc;
(ii) the web name selected S_q-name_ij, and the interaction content C_int received by the at least one second user Uk. thus generating processed coupled web content CWEij
The technical effect achieved is an efficient and contextualised processing of the content.

The user interface 21 is also configured to allow a display of the processed coupled web content CWEij.

According to the invention, the processed coupled web content CWEij can be linked by second web content which can be coupled CW2ij stored for the at least a second user Uk.

In other words, a second user Uk can link, or, in general, render reachable, the processed coupled web content CWEij from its second web content CW2ij.

Moreover, the system which implements the q-lynk is not reduced to a simple coupling mechanism between strings of web names q-name and sets of URLs with display of the relative resources.

In effect, the system according to the invention comprises a further level of interaction with physical elements to represent the information coupled to a certain web q-name.

Figure 1A:
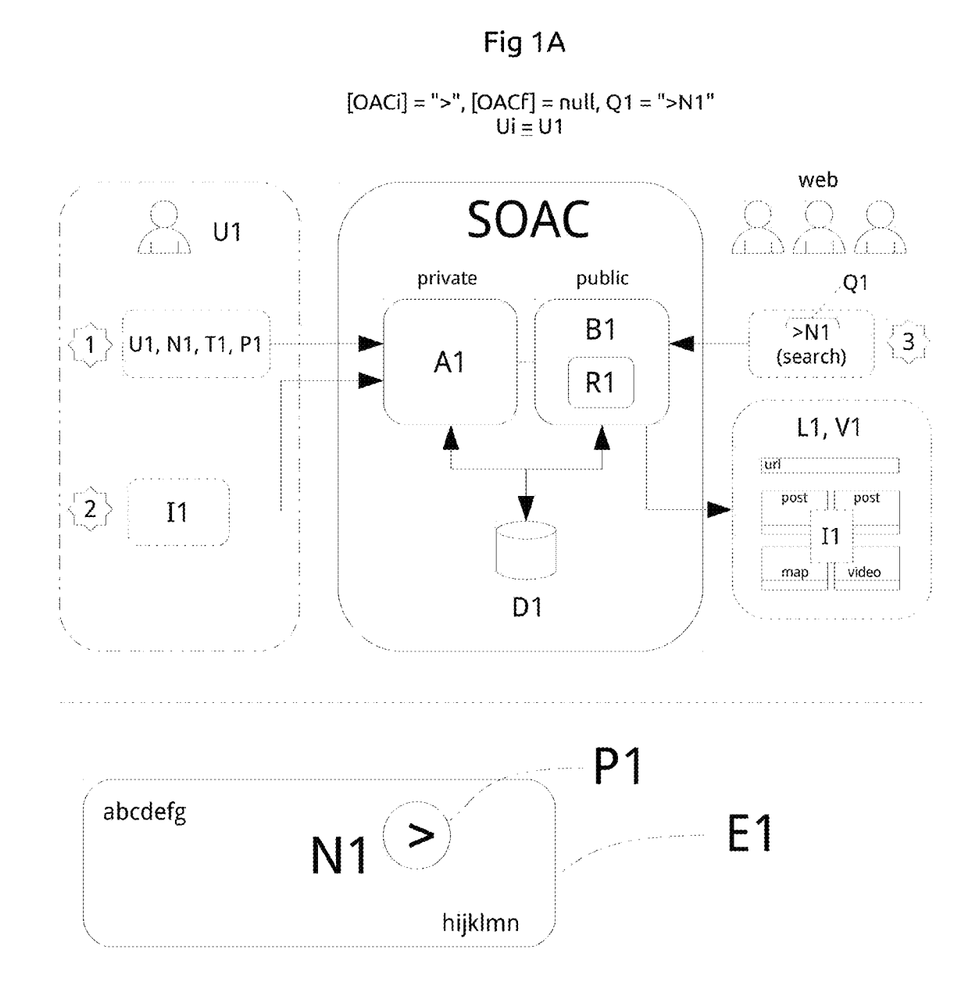
Figure 1B:
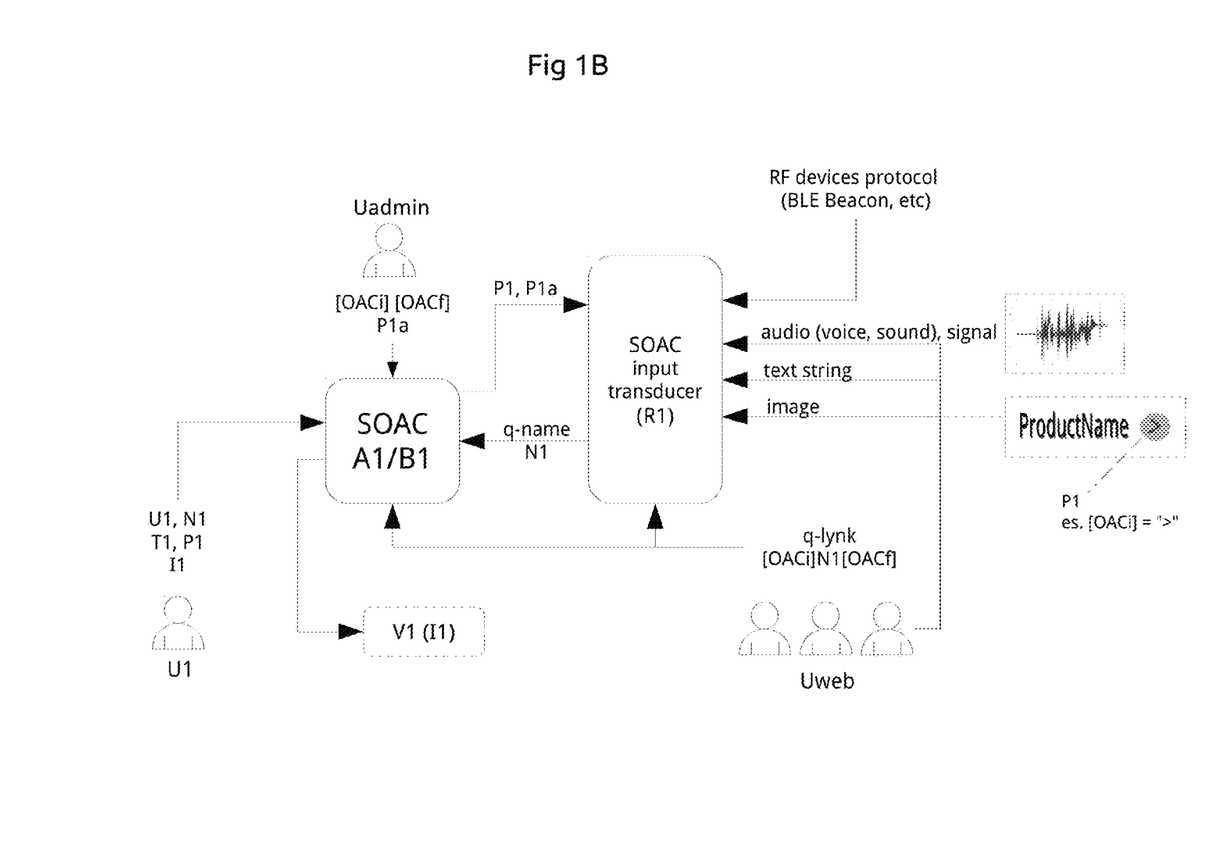

With reference in particular to FIGS. 1 and 1B, the online software application SOAC can extract a web name q-name starting from an image or an audio clip provided by a generic user of the application (Uweb), thanks to the recognition/pointers pattern configuration (P1, P1a for audio, images, signals, etc.) provided by the owner user U1 of the web name q-name N1 or by administrative users of the application (Uadmin).

The processing unit 10 comprises an eighth reception module 113 configured for receiving f13 a pointer device P1, P1a representing the web name q-name_ij, in a multimedia content.

More specifically, the system according to the invention comprises a detection module 20 configured for reading f20 a web name q-name indicated by a pointer P1, P1a representing the web name q-name_ij, in a multimedia content, such as an audio clip or an image.

According to the invention, the pointer device P1, P1a is a marker/recognition pattern of a corresponding web name q-name f3.4 stored in the memory module 103 to which the web content which can be coupled CWij is coupled.

The pointer device P1, P1a can also be a sound or signal associated with a certain q-name.

The logics described for selecting a web name representing web content which can be coupled CWij are achieved in particular by an operator software OAC.

According to the invention, the operator software OAC is configured for identifying a web name q-name_ij as representing web content which can be coupled CWij to the web name q-name_ij, wherein the web content which can be coupled CWij can be coupled to the web name q-name_ij as a function of the coupling logic L_acc.

According to the invention, the web content which can be coupled CWij can be selectively processed as a function of a selected web name S_q-name_ij and processing content C_elab by the at least one first user Uk as a function of the coupling logic L_acc, as described above.

According to the invention, the web content which can be coupled CWij can also be processed selectively as a function of the web name selected S_q-name_ij, and the interaction content C_int received by the at least one second user Uk.

The operator software OAC according to the invention is configured for recalling the selected web name S_q-name_ij using a predetermined symbolic sequence which will be described in more detail below.

With reference to FIG. 1A, where q-name (where "q" means "quick", corresponding to the element N1 in FIG. 1) refers to a pre-registered generic name, with visibility extended to the operational domain of the online software application which implements the operator software OAC, and [OACi] and [OACf] refer, respectively, to a predetermined sequence (f3.5) of characters (alphanumeric or symbols) for initial and final control, the text string (element Q1 in FIG. 1A)
[OACi]q-name[OACf]
is defined as q-lynk (where "y" means "by you", with reference to the fact that the users can also be content creators), whilst
q-name
represents an arbitrary case insensitive name ("a" is equivalent to "A") which may contain blank spaces and other special characters (e.g. /*.) in addition to alphanumeric characters, with the exclusion of the sequence [OACf].

Any initial and final blank spaces do not form part of the q-name:
that is to say, in the text string
"name selected"
the q-name is only "name selected".

If simply the character ">" is used as operator software OAC (which is reminiscent of an arrow or the bow for releasing it, to quickly reach a target), and if one considers a zero sequence as [OACf], then the q-lynk is represented simply by the text string
>q-name
which, if entered into a search field of an online software application which implements the OAC, launches the display of specific content which the owner of the q-name has predetermined by means of the supplier of the application.

In other words, any user of the SOAC keying in ">q-name" in the content search tool of the SOAC will be shown only the content predetermined by the owner of the q-name.

The SOAC facilitates the entry of the q-lynk in question presenting interactively any other q-lynks already registered which start with the same characters gradually keyed in.

An operator has, in this way, been defined, that is to say, a symbol which identifies a functionality, which couples rapidly, to a given name q-name selected by a user, a flow of very specific content, also predetermined and controlled by the user, according to the above-mentioned coupling logic L_ACC.

The implementation of the operator OAC must guarantee the essential requirements of speed, selectivity, reliability, controllability of the introduction of q-name and the display of the content.

More specifically:

Speed: the interaction requested with the user to obtain the results must be a minimum and fast (few characters keyed in, few clicks or taps, etc.), and the display of the results must be equally fast;

Selectivity: the user must be facilitated in the identification and selection of the desired q-lynk starting from the set of q-lynks already registered;

Reliability: the content or results associated with the q-lynk must only be those provided for by the owner user of the respective q-name. The owner of the q-name can, however, select content open to interactions with other users (e.g. social network posts), but the structure of the information to be displayed must not depend on other factors (such as popularity or ranking mechanisms of the content);

Controllability: the owner user of the q-name must be able to change as required the selection of the content to be associated with the q-lynk during the validity of the registration of the q-name.

Examples of q-lynk are
>oliodivino
where ">" represents [OACi], "oliodivino" represents the q-name, [OACf] is a zero sequence;
->oliodivino
where "->" represents [OACi], "oliodivino" represents the q-name, [OACf] is a zero sequence;
>olio divino
where ">" represents [OACi], "olio divino" represents the q-name, [OACf] is a zero sequence;
>olio.divino
where ">" represents [OACi], "olio.divino" represents the q-name, [OACf] is a zero sequence;
>olio divino<
where ">" represents [OACi], "olio divino" represents the q-name, "<" represents [OACf];

By extension, the string
oliodivino
may represent a q-lynk wherein [OACi] and [OACf] are zero sequences. In this case, the software allows the use of q-lynk to be managed by a dedicated function such as graphical pushbuttons for the entry, as shown in more detail below.

For sake of brevity, reference is made in this document to the first type of q-lynk amongst the examples shown above, it being understood that the functions described in this document and in the examples below are considered to be extended to the general definition of q-lynk.

FIG. 1A shows a graphical diagram of the functions described above, where the element S1 represents the online application SOAC; the element A1 represents the private part of the SOAC, which after login provides functions dedicated to the owner U1 of the q-name N1, by which U1 also specifies the duration of the validity of the q-name (indication T1 in the drawing, where T1 can indicate both the lifetime of the q-name and any TAGs attributed to the q-name or accessory properties of the q-name), and the set I1 of content associated with the q-name; D1 represents the database of S1 designed for that information; B1 indicates the public part of the SOAC, including the search module R1 which provides as a result the representation V1 on the basis of the preselected content I1; the display V1 may also be invoked directly by the URL L1 assigned ad hoc by the SOAC.

By means of the dedicated section A1 (FIG. 2), the owner user of the q-name may manage (update, modify) the association of the content starting from the initial ones. The content is selected and displayed on the basis of the functions provided by the SOAC (for example, what it is possible to share publicly if the SOAC is a social network).

If the SOAC comprises the preparation of the content (e.g. social network posts, messaging . . . ), the insertion of the character ">" may launch a contextual menu in which it is possible to select whether to consider the character ">" as any other text character, or as the start of a q-lynk, in which case the SOAC may facilitate the insertion of the desired q-lynk from those preregistered.

The q-lynk inserted will be highlighted with respect to the surrounding text and will launch the content predetermined by the owner of the q-name associated with the q-lynk.

Alternatively, the q-lynk may be directly inserted and recognised by the SOAC as such, as occurs with the hashtags (#). Further, the graphical interface of the SOAC can provide a dedicated pushbutton to introduce the sequence [OACi].

The provider of the SOAC may allow the owner user of the q-lynk to interactively mark the content to be associated with the q-name even during preparation, by means of markers (TAG) or other dedicated methods. For example, in a social network, in order to add a certain post to the set of those already associated with the q-name, it is possible to add an option of the type known as "Associate to your q-lynk" to those available for the management of the post, using the usual dropdown menus.

In order to better render the idea of the intrinsic functionality of q-lynk, application examples in various contexts are provided below.

If the following is entered in the search field of a social network such as Facebook
>oliodivino
one or more particular posits will be displayed (for example with the sharing of the company website), or a selection of posts on the basis of one or more hashtags, all specified by the owner of the q-name "oliodivino", who, by using Facebook, will have registered the q-name "oliodivino" beforehand and established the criteria for displaying the associated content. Considering the possibility of sharing the multimedia content of other channels (videos, maps, etc.), the owner user of the q-name can in this way associate, to the respective q-lynk, a multi-channel information node which is also a web space to all intents and purposes (with its own URL) dedicated to the relative idea, and managed autonomously without particular technical skills.

It is possible to select multilingual content on the basis of different q-lynks, for example by means of
>oliodivino.it
>oliodivino.en Moreover, by keying in the first letters of the q-name in the search field, such as in the case of
>oli
the graphic interface of the search field will display a list of the q-names already registered starting with "oli", marking the q-lynks, for example, with the category "Ideas" with respect to "Pages", "Places", "Persons", "Hashtags" and so on.

On the other hand, by writing a post and entering ">oliodivino", this string will be recognised and highlighted as a q-lynk (in a similar fashion to what occurs for the hashtags), and clicking on it will display the content predetermined by the owner of the q-name "oliodivino".

This display will have a dedicated Facebook URL for the entire duration of the validity of the q-name. The use of the q-lynk in this case can represent a creative alternative to the URL shortener services.

The owner of the q-name "oliodivino" can put the q-lynk on the label of the relative oil without using QR codes, without dedicating further Facebook pages to the particular product, simply by specifying beforehand the posts to be displayed extracted from the page already managed.

The same user can register another q-name "vetrinadivina" to associate the q-lynk ">vetrinadivina" to a counter display of its various products (wine, oil, etc.).

Another example: a counter of typical products, such as cold meats and cheeses, in which the dealer displays some graphically attractive labels on which q-lynks recall specific posts which give details of the background and the particular characteristics of the products (">mortadella_tartufata", ">carpaccio_trentino", etc.).

On an instant messaging application such as WhatsApp, in a chat with a dedicated "q-lynk" contact/service, by keying in
>oliodivino
a link to an Internet site (or a URL of an Internet resource) will be obtained which the owner of the q-name "oliodivino" will have previously specified by means of dedicated WhatsApp functions.

Or, in a chat with any contact, by keying in
>oliodivino
the q-lynk will be automatically recognised and highlighted as a hyperlink to a URL which has been previously specified by the owner of the q-name.

On a search engine such as Google, by entering in the search field
>oliodivino
the result will be a series of URLs predetermined by the owner of the q-name "oliodivino" registered by means of Google, including, if necessary, the URL associated with the q-name "oliodivino" registered on Facebook of the previous example.

Advantageously, the search results will not be subject to di ranking algorithms or SEO (Search Engine Optimization) techniques.

On a video sharing platform such as YouTube, by entering into the search field
>oliodivino
the result will be the display of some videos (and only those) predetermined by the owner of the q-name "oliodivino".

Another example: ">myrock" to launch some promotional video clips selected by a music band. The q-lynk can contribute to the merchandising of the band's creations.

The previous examples refer to cases in which the range (visibility) of the q-lynk is limited to a single SOAC.

More in general, "uni-lynk" is defined as a q-lynk whose q-name, owned by the same user, has visibility and validity in the context of more than one SOAC.

Figure 5:
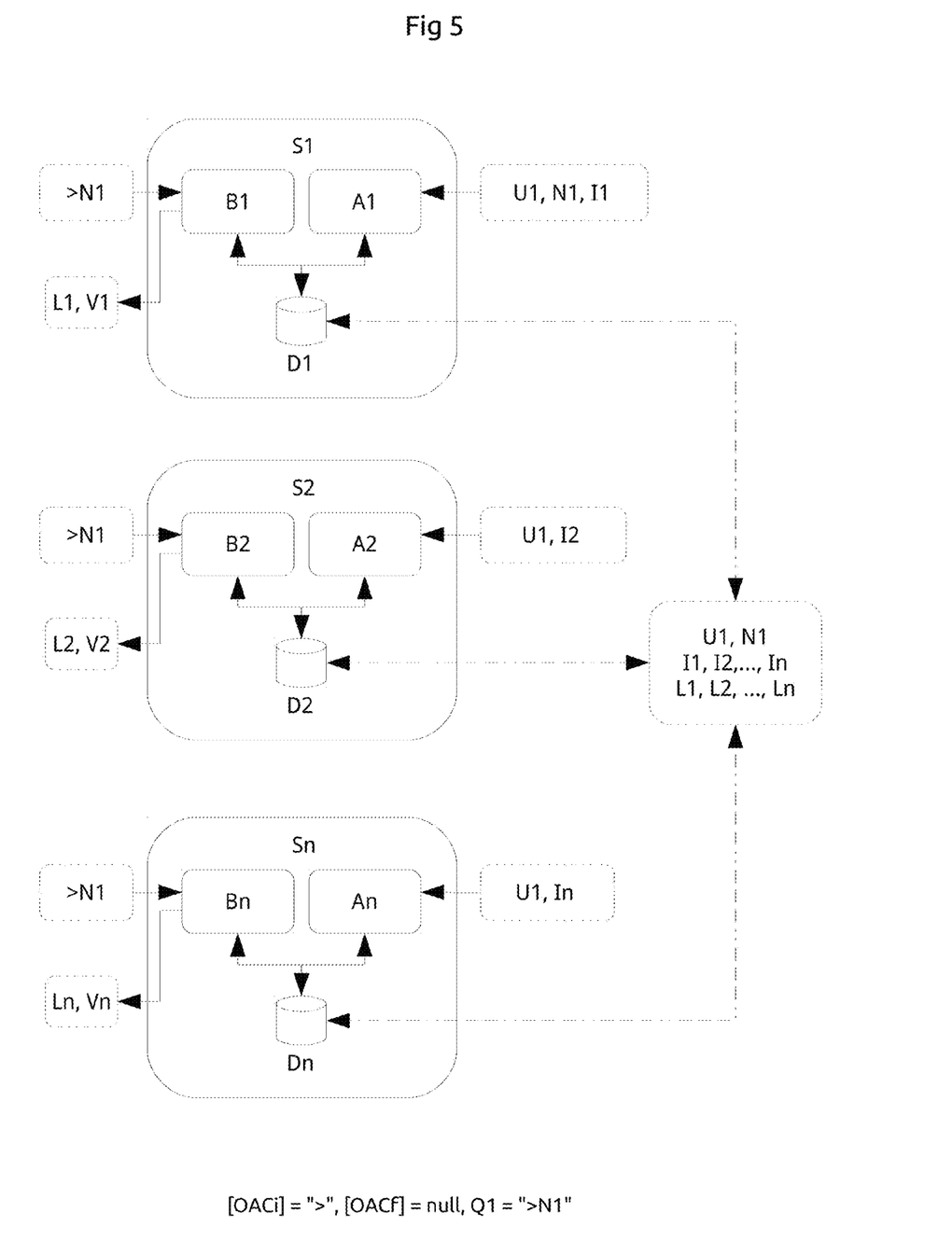

Different SOACs can share information relating to a same q-name (owner user, text string of q-name, duration of validity of q-name) synchronising the relative databases, as in FIG. 5. In this case, the same q-lynk will launch the content provided by the owner user of the q-name according to the contexts of the SOACs.

In order to guarantee a sufficient responsiveness to the requirements of the users, it is worthwhile that the management of these databases remains inside the individual SOACs.

For example, SOAC1 (S1) could represent a social network such as Facebook and SOAC2 (S2) could represent an instant messaging application such as WhatsApp, or SOAC1 could be a search engine such as Google and SOAC2 could be a video sharing platform such as YouTube.

A complete implementation of the system/method according to the invention is indicated here in which q-names of an online software application are coupled with content coming from other online software applications.

In this specific case, the online application is executed on a web server at URL http://www.qlynk.net, but can also be implemented on apps for mobile phones and local corporate servers (with visibility restricted to the corporate network or to private networks in general).

By using a dedicated private section (A1 of FIGS. 1A and 2) of the site qlynk.net, which is accessible after login, a user can register and reserve the relative q-name, establishing the duration of validity of the registration.

This service can also be managed under payment by owners of qlynk.net. In the specific private section of qlynk.net, the user in question can establish which content to associate to the relative q-name. In particular, qlynk.net allows, using the APIs (Application Programming Interfaces) provided by the various social networks, selection of the content to be associated with the q-name:

an image representing the q-name (optional)
a selection of individual Facebook public posts using the URLs of the individual posts;
a selection of public Facebook posts, extracted from an existing page or profile, filtered automatically using one or more hashtags or other text strings (e.g. all the posts of a page which contain both the hashtags "#olio #biologico", as shown in FIG. 2);
a feedback from a Facebook page;
preview of one or more YouTube videos, by mans of individual URLs;
Google Maps by means of individual URLs;
public content, associated with the q-name, similarly selected by other social networks or content management systems (Twitter, Instagram, Pinterest, blog, etc.).

On the public side of the application web qlynk.net (which may also be consulted by smartphone apps), there is a simple search field (R1 in FIG. 3), alongside which there is an icon (for example, in the form of a magnifying glass) to confirm and send the text string to search for, as an alternative to the enter button. If the search string entered does not start with the character ">" (or another sequence which defines an OAC), qlynk.net launches the search on other external search engines (for example, Google).

Figure 3:
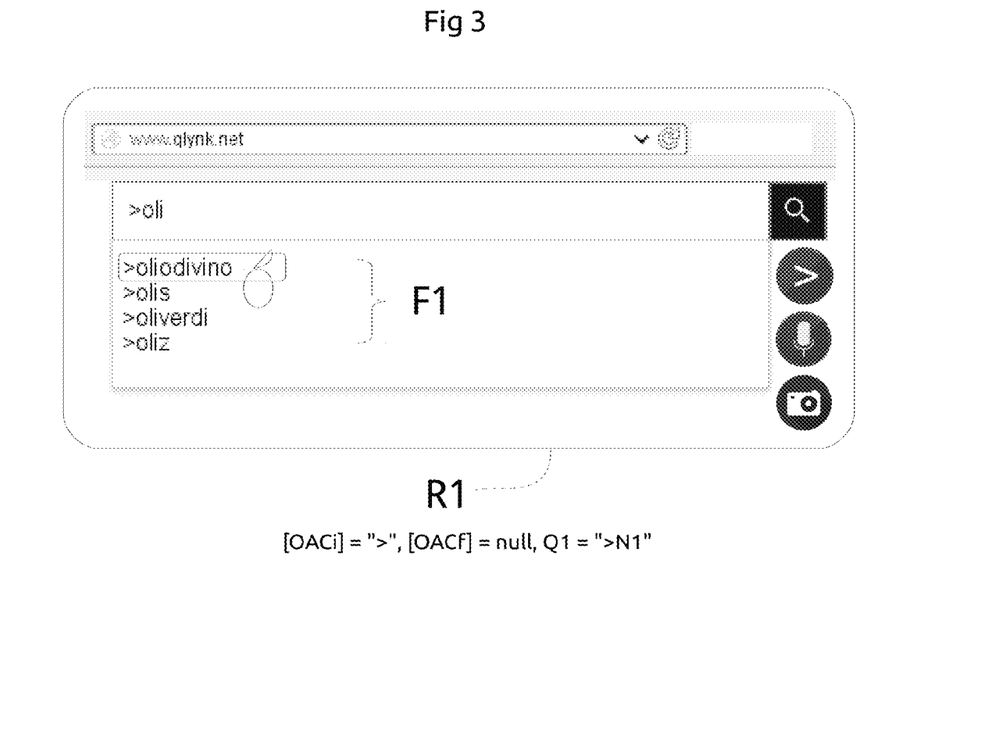

If, on the other hand, the search string starts with the character ">", for each further character added qlynk.net interactively provides the list of q-lynks already registered, thus facilitating the choice by means of a drop-down menu positioned immediately under the search field (automatic completion in drop-list), and also by displaying a predetermined miniature image, if necessary loaded by the owner of the q-lynk (filter F1 in FIG. 3).

In addition, in order to help the user in the selection of the desired q-lynk, during selection of the content by the owner of the q-name (FIG. 2), it is possible to attribute, again by the owner, one or more labels (TAG) which can operate as selection filters.

The management policy for these TAGs (whether it is arbitrary or selected from a predetermined set) depends on the controllers of the qlynk.net service.

For example, the owner of "oliodivino" could select the TAG "oil" and 'biological' for its q-lynk. By keying in "oli" in the search field (or a number of characters predetermined by qlynk.net), the interface of qlynk.net can interactively present the TAGs attributed to the q-lynks of the list displayed.

Figure 4:
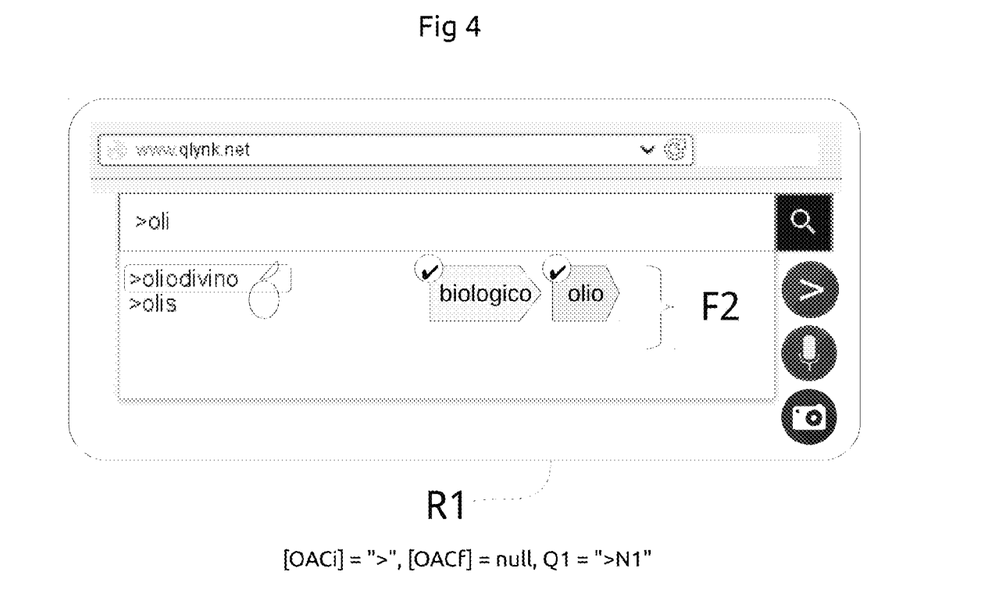

Clicking (or tapping, for a mobile device) on these TAGs, reduces the list of q-lynks suggested (filter F2 in FIG. 4).

FIG. 4 also shows a pushbutton with the symbol [OACi] (e.g. the character ">") to facilitate the introduction by touchscreen.

The homepage of qlynk.net may however show an extended TAG Cloud which filters the q-lynks registered by categories.

The icon in the form of a microphone in FIG. 4 indicates the possibility of searching for a certain q-lynk by voice, if necessary providing only the initial part.

This functionality further links with the aspects of selectivity and speed described above. By using the interface of FIG. 4 on a smartphone or other mobile phone device, the possibility of calling a certain q-lynk by voice represents a further factor which improves the user experience in many situations: it is merely necessary to click on the microphone icon which acts as a pushbutton, pronounce the q-name or an initial part of it, and the software reacts as if the characters were being keyed in by hand.

By selecting the desired q-lynk, and sending the search string thus selected, qlynk.net displays a web page (V1) with the content associated with the corresponding q-name.

Figure 7:
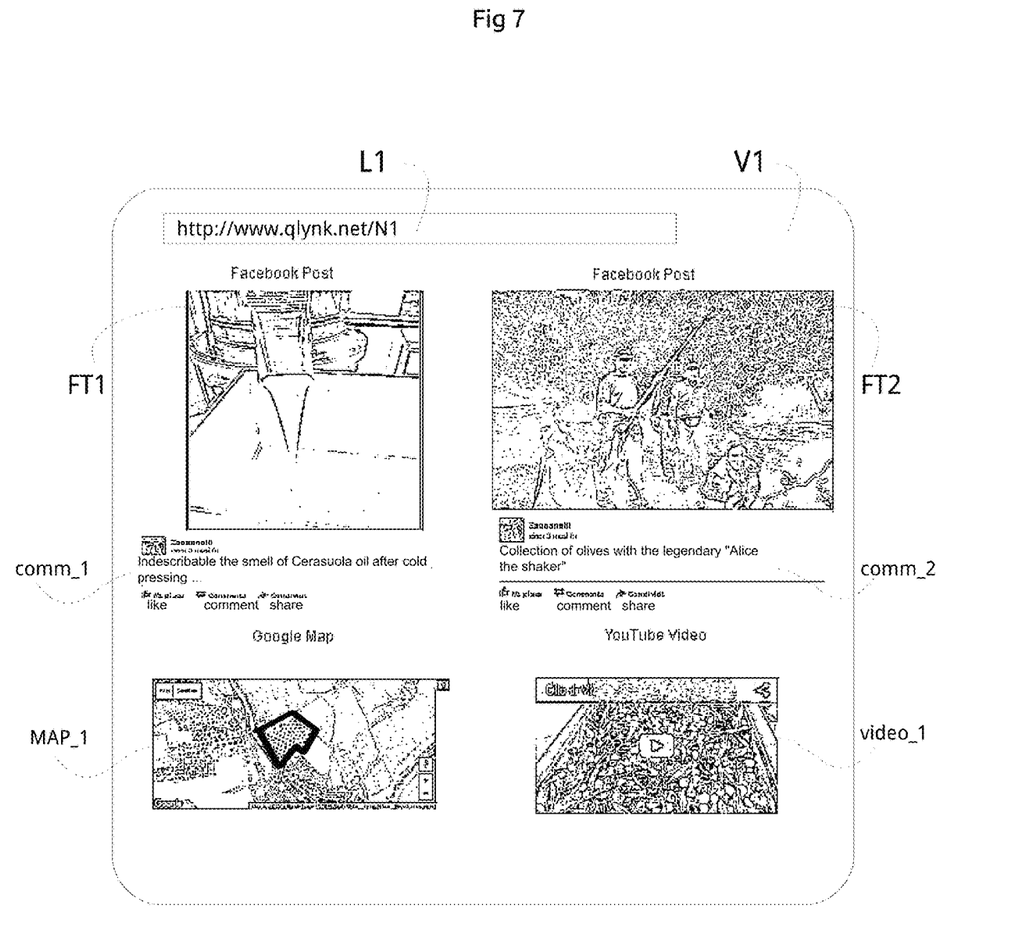

FIG. 7 shows an example with some Facebook posts (in which the users can leave likes and comments, or in which other websites can be shared; the posts shown are extracted from an existing Facebook page using a double hashtag filter), Google maps, YouTube videos.

The SOAC attributes to this page a dedicated URL (L1), for example http://www.qlynk.net/q-name, with q-name the string selected by the owner user. The SOACM may also execute a pre-caching of the content with timing suitability scheduled to optimise the reactivity of the requested views.

An application of this type can be used, for example, by a chain of sales outlets to provide dynamic and captivating information on selections of products, in a fast and focused fashion (a dedicated q-lynk may be presented on each of these products), extracting the content starting from what has already been published on social networks by the suppliers of the products, with the resulting advantages in terms of personal relational involvement.

The owners of the various q-lynks (and the authors of the relative associated content) can be directly the producers, whilst other q-lynks can refer to promotions and initiatives for the visitors to the sales outlets, or other original and interesting ideas, which can be readily displayed on smartphones by keying in just a few characters. It is possible, for example, to associate q-lynks with shop fronts or product displays (e.g. ">offerte.bio"): a visitor may view the products displayed with calm and in the preferred places and at the preferred times, finding them in a single webpage which provides a series of posts suitably extracted from the social networks, with photos FT1, FT2, a map MAP_1, a video Video_1 and comments comm_1, comm_2 on the products.

More specifically:

photo FT1 shows an instant of the procedure for processing the oil;

photo FT2 shows an instant of the step for harvesting olives;

the map MAP_1 shows a map locating the farm;

the video Video_1 shows a video regarding the harvesting of olives.

Figure 6:
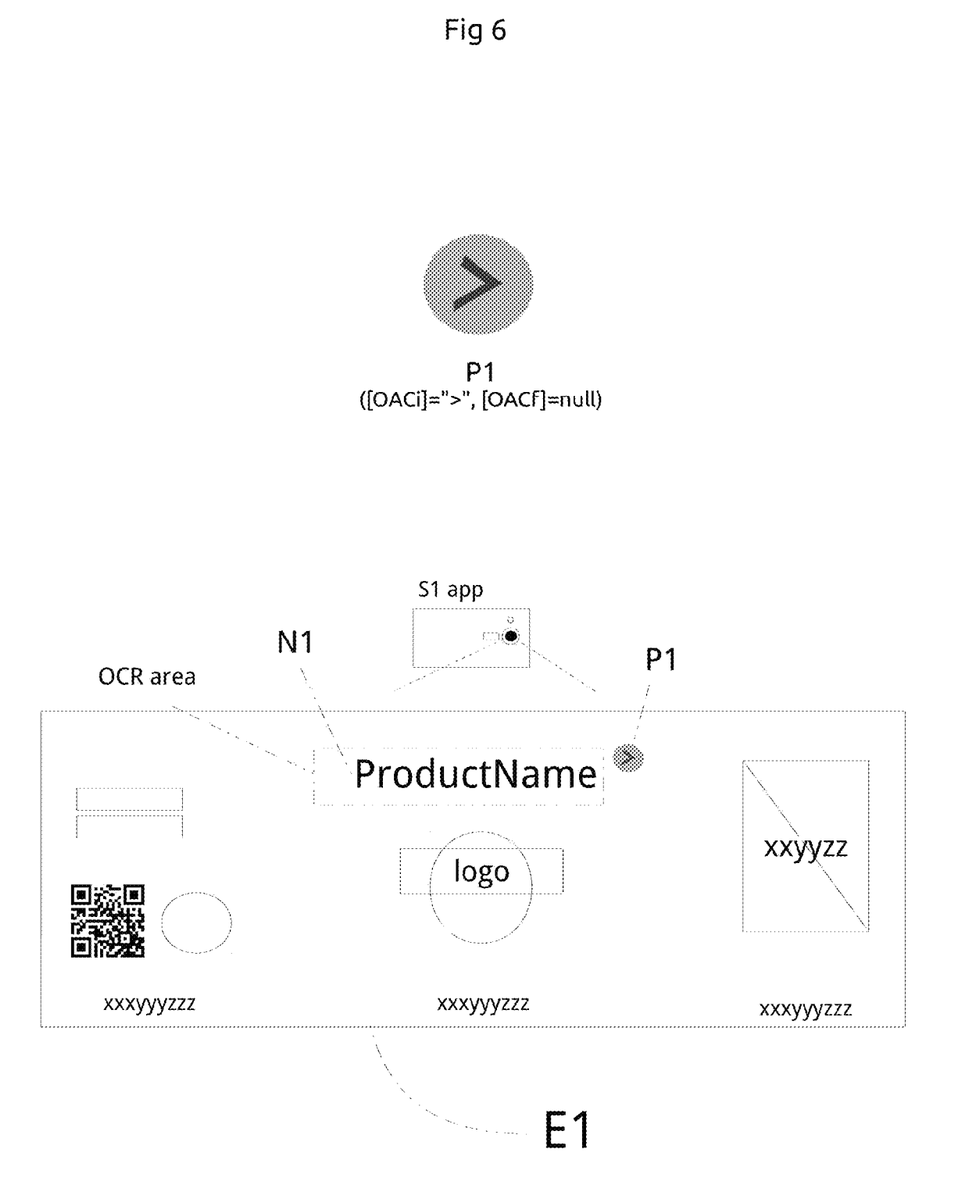

The top of FIG. 6 shows a material object Q-Lynk (P1, q-pointer) even if [OACi] is the character ">".

The physical object may be simultaneously printed with a product label, or applied on top of it, for example on a transparent polypropylene support.

It can be made with high reflectivity materials for a use combined with cameras (e.g. a smartphone): the q-pointer can act as a pointer device for consolidated image recognition techniques, and define the area (the one close to the q-pointer) for converting into text (the q-name) by OCR, in a quick and efficient manner.

The icon in the form of a camera in FIG. 4 indicates the possibility of using the interface of the SOAC (R1 in FIG. 4) also for this purpose (automatic recognition of the entire q-name or part thereof, for example, some letters adjacent to the q-pointer), if it is easy to capture the q-pointer.

The q-pointer, such as a recognition marker, highlights the fact that in the label, or in the display unit where it is displayed, there is a corresponding q-name registered to which is associated preselected web content.

The colour and the shape of the q-pointer may vary, provided its functionality can be identified, when viewed by individuals and by automatic systems.

FIG. 6 also shows a label (E1) of a product with q-lynk >productname (e.g. label wrapped around a bottle), in which it is evident how the use of the q-lynk makes it possible to separate the aesthetical part from the more informative part of the label graphics, unlike the QR code, which may be an important factor in the case of display units in which the products only show the front part (e.g. shelves of a supermarket, or shop windows visible from the road, where the products cannot be handled; the users could quickly obtain information for the individual products even at a distance).

Similar considerations apply for displaying the q-lynk on screens and displays in general, in which the q-pointer denotes the presence of a q-name registered.

It is therefore evident how the Q-Lynk system, based on the combination of q-pointer (P1) and information product (S1, SOAC) which supports the functionalities of content association operator (OAC), can be used in any type of industry (in accordance with the industry requirements, art. 49 of Italian Legislative Decree 30/2005), as it is applicable to any type of product, from electronic items to food products.

Expanding the field of application, if the SOAC qlynk.net shares the relative data base of the q-names with other applications which implement the OAC (FIG. 5), it can, following suitable conventions, perform the role of main service for registering and managing uni-lynks, which is a complementary role to, and not in opposition with, the DNS.

If this service is also used by Browsers, the keying in of a q-lynk in the address bar (e.g. >oliodivino) can directly launch the display of web content by means of a particular predefined URL associated with the q-name, giving the uni-lynk a transversal value on the Internet.

The information to be managed in the consultation of the database, in this scenario, is therefore at least the following:

information independent of the application:
q-name (N1; e.g. oliodivino); owner user (U1; user ID, first name, surname, etc.); period of validity of the q-name (e.g. 6 months); URL predefined (e.g. URL L1 associated with view V1: http://www.qlynk.net/oliodivino);

information dependent on the application:
URL app. 2 (e.g. URL L2 associated with view V2: http://www.facebook.com/qlynks/oliodivino)
URL app. 3 (e.g. URL L3 associated with view V3: http://www.youtube/oliodivino)
. . .
URL app. N (e.g. URL Ln associated with view Vn: http://www.google.com/qlynks/oliodivino)

The contents (I1, I2, . . . , In) are defined by the owner of the q-name N1, by means of the applications SOAC (S1, S2, . . . , Sn) which support the q-lynk/uni-lynk. The displays (V1, V2, . . . , Vn) of the content depend on the SOAC application used.

Returning to the general implications resulting from definition of the q-lynk, from the prospect of promotion of corporate or industrial products, the q-lynk represents an element for connection between the web part (the presence or visibility on Internet) and the "offline" part (the presence at a material level), so also an additional support for retail purposes.

The events, the selections of products, or whatever else the company considers useful, can have a concrete reference for a type of communication which is immediate, simple and efficient, for involving individuals without the need for installation of other apps on smartphones (e.g. for the reading of QR codes, or for augmented reality).

For example, the message "find us with >companyname" may be useful in the communication, instead of inviting a search for the company on Google (and trusting in SERP positioning), or specifying whether it is a Facebook profile, page, community, site, blog or something else, losing the message in different names and contexts. Or similarly, "find our product with >oliodivino", "take part in our event >eventcompany", and so on.

On the Internet, the q-lynks can contribute to conveying traffic towards the corporate spaces through channels not controlled by the company (whether they are social networks, blogs, media sharing platforms, etc.), which make use of hypertext sharing and connections.

For example, a Facebook page, not managed by the company in question, can present a post with a q-lynk registered by company personnel. In any case, the use of q-lynk in a crossed fashion between different channels can contribute to the circularity and the dissemination of content on the Internet.

However, changing perspective, one can consider a communicational paradigm in which at the centre there is essential content (or a set of contents) pointed by a q-lynk, content which represents a core of information in which the author is free to choose the preferred channels (microblogs, social network post, set of videos, rather than a website page), in which it is possible to transfer the ideas without particular technical skills, and being sure that the availability of the content does not depend on factors as popularity evaluations, level of interactions of other users, SEO techniques. An idea, associated with an identifying and evocative name (the q-name), which can represent a collector of other ideas, or stop at the basic and invite further investigation by means of links and sharing.

The implementation of the q-lynk and of the software referred to here as q-lynk.net therefore answers the actual communication needs also at a corporate and industrial level (focus on products, promotions, events, technical data sheets . . . ), that is to say, simple and direct mechanisms for associating an arbitrary name to web content strictly pertinent to predefined objects and ideas.

This enables web content to be associated to the heart of an idea without dispersions, simultaneously suggesting further study starting from a core of consistent and essential information, predetermined by the author of the idea.

The q-lynk, in the form ">q-name", or in the other forms described above, when it is etched, printed or in any another way shown on material objects, becomes an expression of an industrial design which leaves a mark, a sort of signature of the author of the idea.

The applications can range from T-shirts to food products, from machinery to accessories.

The application of the q-pointer on material objects, which has as added value the q-lynk function, constitutes an invention which can be industrialized that meets the needs of focused and efficient communication or promotion, and in many cases can replace the unattractive QR code, given that the speed of the name-content association in the methods described may be more convincing and stimulating than the capturing of the QR, which is often a not very practical operation.

Moreover, the persistent URL associated with content correlated with the q-lynk in any case allows the content to be quickly consulted even if launched by QR codes, radio frequency TAGs, BLE Beacons or other devices which are able to communicate the information of the URL or of a string. The application of the q-lynk may therefore be extended to objects, products, consumer goods (for example, also food products in supermarkets) which bear QR codes, active or passive RF TAGs, or whatever else can remotely communicate a URL (or, more generally, a text string which may contain the q-lynk), in order to implement a sort of effective speaking label complementing that already etched or printed. Rather than launching a particular website, a relative sub-page, or a particular page of a social network, basic information is launched contained in a space of which the author may be directly the owner of the q-name, a name which can have a connotation with a strong identity and expressiveness, free from formal rules (as is the case with DNS domain names), more enthralling and interactive, without technical complications: one sees a q-lynk, it is pronounced or keyed in partly on a smartphone, and one immediately gets to the heart of the idea. Like drawing back a bow, releasing the arrow and immediately hitting the target (>).

The invention claimed is:

1. A processing system for selective processing of web content comprising:
a first electronic device comprising:
a processing unit configured for executing an online application accessible to a plurality of different users;
wherein the processing unit comprises:
a first reception module configured for receiving, from a first user, a web name, formed as an arbitrary text string, representing web contents for coupling to the web name;
wherein the web contents include a set of textual and multimedia information published on the web using one or more channels, or data sources, including at least one chosen from social networks, video sharing platforms, blogs and geo-referenced maps, usable via devices connected to the internet;
wherein the web contents comprise a plurality among:
a representative image of the web name;
a selection of individual public posts from a given social network using URLs of the individual public posts;
a selection of public posts from a given social network, extracted from a pre-existing page or profile, automatically filtered through one or more hashtags or other text strings;
a feedback from a page of a given social network;
previews of one or more videos from video sharing platforms, via individual URLs;
georeferenced maps using individual URLs;
public content, associated with the web name, similarly selected by other social networks or content management and sharing systems, and through APIs made available by the other social networks or content management and sharing systems;
a first processing module configured for coupling to the web name the web contents as a function of a coupling logic;
a memory module configured for storing web names for the first user, received from the first reception module;
a second reception module configured for receiving from the first user a stored list of the web contents;
wherein the memory module is also configured for storing the web contents coupled to the web name stored;
a third reception module configured for receiving a request for access to the online application;
a first transmission module configured for transmitting a list of web names stored;
a fourth reception module configured for receiving a selected web name selected from the list of web names stored;
an access module configured for accessing the web contents, as a function of the selected web name;
wherein the processing unit also comprises:
a fifth reception module configured for receiving processing content by the first user as a function of the coupling logic;
a sixth reception module configured for receiving interaction content by a second user;
a second processing module configured for processing selectively the web contents as a function of:
the selected web name, and the processing content received by the first user as a function of the coupling logic; the selected web name, and interaction content received by the second user;
the selective processing generating processed coupled web content;
wherein the coupling logic is defined as a function of the online application.

2. The processing system according to claim 1, comprising a second electronic device comprising a user interface, in data communication with the processing unit, and configured for allowing one or more between:
a request for access to the online application by, respectively, by at least one chosen from the first user and the second user;
a request for displaying the web names stored; and
a display of the web names stored.

3. The processing system according claim 1, wherein the user interface is also configured for allowing a selection of the selected web name in the list of web names displayed, wherein the selection is carried out by one or more between the first user and the second user.

4. The processing system according to claim 3, wherein the user interface is configured for one or more between:
allowing an insertion, by the first user, of a list of processing content as a function of the selected web name;
allowing an insertion, by the second user, of a list of interaction content as a function of the selected web name.

5. The processing system according to claim 3, wherein the user interface is configured for allowing at least one chosen from:
a sending of the processing content by the first user, as a function of the selected web name;
a sending of the interaction content by the second user, as a function of the selected web name; and
a display of the processed coupled web contents.

6. The processing system according to claim 5, wherein the processing unit comprises an eighth reception module configured for receiving a pointer device representing the web name, in a multimedia or textual content, wherein the pointer device is a marker/recognition pattern of a corresponding web name stored in the memory module, to which is coupled the web contents.

7. The processing system according to claim 5, comprising a detection module configured for reading the web name indicated by a pointer device representing the web name in a multimedia content in which
the pointer device is a marker/recognition pattern of a corresponding the web name stored in the memory module to which is coupled the web contents.

8. A computer implemented method for a selective processing of web contents, made by an online application accessible to a plurality of different users comprising the steps of;
receiving, from a first user, a web name, formed as an arbitrary text string, representing the web contents for coupling to the web name;
wherein the web contents include a set of textual and multimedia information published on the web using one or more channels, or data sources, including at least one chosen from social networks, video sharing platforms, blogs and geo-referenced maps, usable by devices connected to the internet;

wherein the web contents comprise a plurality among:
- a representative image of the web name;
- a selection of individual public posts from a given social network using URLs of the individual public posts;
- a selection of public posts from a given social network, extracted from a pre-existing page or profile, automatically filtered through one or more hashtags or other text strings;
- a feedback from a page of a given social network;
- previews of one or more videos from video sharing platforms, via individual URLs;
- georeferenced maps using individual URLs;
- public content, associated with the web name, similarly selected by other social networks or content management and sharing systems, and through APIs made available by the other social networks or content management and sharing systems;

coupling to the web name the web contents as a function of a coupling logic;
storing web names for the first user, received from a first reception module;
receiving from the first user a stored list of the web contents;
storing the web contents coupled to the web name stored;
receiving a request for access to the online application;
transmitting the list of web names stored;
receiving a selected web name selected from the list of web names stored;
accessing the web contents coupled, as a function of the selected web name;
receiving processing content by the first user as a function of the coupling logic;
receiving interaction content by a second user;
selectively processing the web contents coupled as a function of:
- the selected web name and the processing content received by the first user as a function of the coupling logic;
- the selected web name and the interaction content received by the second user;
- the selective processing generating processed coupled web content;

wherein the step of coupling logically to the web name the coupled web content is defined as a function of the online application.

9. The computer implemented method according to claim 8, further comprising one or more between the steps of:
- requesting an access to the online application by, respectively, at least one chosen from the first user and the second user;
- requesting a display of the web names stored;
- displaying the web names stored.

10. The computer implemented method according to claim 9, further comprising the following steps:
- selecting the selected web name in the list of web names displayed, wherein the selection is carried out by one or more between the first user and the second user.

11. The computer implemented method according to claim 10, further comprising one or more between the steps of:
- inserting, by the first user, a list of processing content as a function of the selected web name;
- inserting, by the second user, a list of interaction content as a function of the selected web name.

12. The computer implemented method according to claim 8, further comprising at least one chosen from the steps of:
- sending of the processing content by the first user, as a function of the selected web name;
- sending of the interaction content by the second user, as a function of the selected web name; and
- displaying the processed coupled web content.

13. An operator software configured for recalling the selected web name by a predetermined symbolic sequence, the operator being configured for identifying the web name as representing web contents, wherein the web contents are coupled to the web name as a function of a coupling logic;
wherein the web contents are processed selectively as a function of:
- the selected web name and the processing content received by the first user as a function of a coupling logic, and
- the selected web name and the interaction content received by the second user, according to claim 7.

* * * * *